United States Patent
Suzuki et al.

(10) Patent No.: US 10,316,433 B2
(45) Date of Patent: Jun. 11, 2019

(54) CARBON FIBER AND METHOD FOR PRODUCING CARBON FIBER

(71) Applicant: TOHO TENAX CO.,LTD., Tokyo (JP)

(72) Inventors: Yoshinori Suzuki, Tokyo (JP); Toshimichi Nakajima, Tokyo (JP)

(73) Assignee: TOHO TENAX Co., LTD., Tokyo (JP)

( * ) Notice: Subject to any disclaimer, the term of this patent is extended or adjusted under 35 U.S.C. 154(b) by 0 days.

(21) Appl. No.: 15/560,634

(22) PCT Filed: Mar. 29, 2016

(86) PCT No.: PCT/JP2016/060133
§ 371 (c)(1),
(2) Date: Sep. 22, 2017

(87) PCT Pub. No.: WO2016/158955
PCT Pub. Date: Oct. 6, 2016

(65) Prior Publication Data
US 2018/0051399 A1 Feb. 22, 2018

(30) Foreign Application Priority Data
Mar. 31, 2015 (JP) .................... 2015-074063

(51) Int. Cl.
*D01F 9/12* (2006.01)
*D01F 9/32* (2006.01)
(Continued)

(52) U.S. Cl.
CPC ............ *D01F 9/32* (2013.01); *D01F 9/225* (2013.01); *D06M 15/41* (2013.01); *D06M 15/51* (2013.01);
(Continued)

(58) Field of Classification Search
CPC ............ D01F 9/32; D01F 9/22; C01B 32/05
See application file for complete search history.

(56) References Cited

U.S. PATENT DOCUMENTS 9,745,671 B2 8/2017 Suzuki
2008/0118427 A1 5/2008 Leon y Leon
(Continued)

FOREIGN PATENT DOCUMENTS

JP H10-25627 A 1/1998
JP 2002-54031 A 2/2002
(Continued)

OTHER PUBLICATIONS

Machine Translation of JP 2002054031 to Toray, Ind. (Year: 2002).*
(Continued)

*Primary Examiner* — Daniel McCracken
(74) *Attorney, Agent, or Firm* — Norris McLaughlin PA

(57) ABSTRACT

Carbon fibers having a high tensile strength satisfy the relationship represented by formula (1) and one of the relationships represented by formulas (2) to (5):

$$La \geq 1 \qquad (1),$$
$$La \leq -0.5 + 0.01 \times TM \text{ when } 170 \leq TM \leq 230 \qquad (2),$$
$$La \leq -37.3 + 0.17 \times TM \text{ when } 230 < TM \leq 240 \qquad (3),$$
$$La \leq -2.5 + 0.025 \times TM \text{ when } 240 < TM \leq 300 \qquad (4), \text{ and}$$
$$La \leq 2 + 0.01 \times TM \text{ when } 300 < TM \qquad (5)$$

where La is a crystal size in nm in a direction parallel to an axis of the fibers measured with by X-ray diffraction, and TM is a tensile modulus in GPa.

8 Claims, 14 Drawing Sheets

(51) Int. Cl.
*D01F 9/22* (2006.01)
*D06M 15/41* (2006.01)
*D06M 15/51* (2006.01)
*D06M 15/55* (2006.01)
*D06M 15/564* (2006.01)
*C01B 32/05* (2017.01)
*D06M 101/40* (2006.01)

(52) U.S. Cl.
CPC .......... *D06M 15/55* (2013.01); *D06M 15/564* (2013.01); *C01B 32/05* (2017.08); *D01F 9/22* (2013.01); *D06M 2101/40* (2013.01); *D06M 2200/40* (2013.01)

(56) References Cited

U.S. PATENT DOCUMENTS

2011/0158895 A1 6/2011 Wang et al.
2014/0037776 A1 2/2014 Wang
2016/0130732 A1 5/2016 Suzuki

FOREIGN PATENT DOCUMENTS

| JP | 2002054031 | * | 2/2002 | ............... D01F 9/22 |
| WO | 2015/012349 A1 | | 1/2015 | |
| WO | 2015/152019 A1 | | 10/2015 | |

OTHER PUBLICATIONS

International Search Report dated Jun. 8, 2016, dated Jun. 21, 2017.
English Translation of International Search Report dated Jun. 8, 2016, dated Jun. 21, 2017.
Offer for information submitted in connection with JP 2017-510026 on Aug. 22, 2018 including English translation thereof.
European Search Report for corresponding application EP 16772836.9 dated Oct. 9, 2018.
X. Ma, et al., "Mechanical, Microstructure and Surface Characterizations of Carbon Fibers Prepared from Cellulose after Liquefying and Curing", Materials, 2014, vol. 7, pp. 75-84.

* cited by examiner

CARBON FIBER AND METHOD FOR PRODUCING CARBON FIBER

This application is a 371 application of PCT/JP2016/060133 filed 29 Mar. 2016, which claims foreign priority benefits under 35 U.S.C § 119 of Japanese Application No. 2015-074063 filed 31 Mar. 2015, the disclosures of each of which are incorporated by reference herein in their entirety.

TECHNICAL FIELD

The present invention relates to carbon fibers produced through a carbonization process.

BACKGROUND ART

Carbon fibers are produced by heating (carbonizing) precursor fibers produced from, for example, polyacrylonitrile fibers, rayon fibers, cellulose fibers, or pitch fibers. Using precursor fibers produced from polyacrylonitrile fibers for example, carbon fibers are produced through an oxidization process for heating the precursor fibers in an oxygen atmosphere (inside an oxidization oven), and a carbonization process for heating the fibers resulting from the oxidization process (hereafter, oxidized fibers) in an inert atmosphere (inside a carbonization furnace). The fibers are heated while passing (being fed) through the oxidization oven and the carbonization furnace.

The carbonization process involves heating with, for example, an electric heater. While the atmosphere inside the carbonization furnace is being heated with an electric heater, oxidized fibers pass through the furnace and are heated indirectly.

The conditions for the carbonization process, including temperature and fiber stretching, are optimized to produce carbon fibers with various properties, such as tensile properties and compressive properties (e.g., Patent Literatures 1 and 2).

CITATION LIST

Patent Literature

Patent Literature 1: Japanese Unexamined Patent Application Publication No. 10-25627
Patent Literature 2: Japanese Unexamined Patent Application Publication No. 2002-54031

SUMMARY OF INVENTION

Technical Problems

However, optimizing the temperature conditions and the stretching conditions for the carbonization process as described in Patent Literatures 1 and 2 may not produce carbon fibers with a high tensile strength (high elongation).

In response to the above issue, one or more aspects of the present invention are directed to carbon fibers having a higher tensile strength, and a method for producing such carbon fibers.

Solution to Problems

Carbon fibers according to an embodiment of the present invention satisfy the relationship represented by formula (1) and one of the relationships represented by formulas (2) to (5):

$$La \geq 1 \tag{1},$$

$$La \leq -0.5 + 0.01 \times TM \text{ when } 170 \leq TM \leq 230 \tag{2},$$

$$La \leq -37.3 + 0.17 \times TM \text{ when } 230 < TM \leq 240 \tag{3},$$

$$La \leq -2.5 + 0.025 \times TM \text{ when } 240 < TM \leq 300 \tag{4, and}$$

$$La \leq 2 + 0.01 \times TM \text{ when } 300 < TM \tag{5}$$

where La is a crystal size in nm in a direction parallel to an axis of the fibers measured with X-ray diffraction, and TM is a tensile modulus in GPa.

Carbon fibers according to another embodiment satisfy the relationships represented by formulas (6) and (7):

$$Lc \geq 1 \tag{6, and}$$

$$Lc \leq 0.4 + e^{\wedge}(0.006 \times TM) \tag{7}$$

where Lc is a crystal size in nm in a direction perpendicular to an axis of the fibers measured with X-ray diffraction, and e is a base of a natural logarithm.

A method for producing carbon fibers according to another embodiment includes carbonization using microwave magnetic field heating and/or plasma heating.

Advantageous Effects of Invention

The carbon fibers according to one embodiment of the present invention have the above structure and thus have a high tensile strength.

The carbon fiber production method according to one embodiment of the present invention can produce carbon fibers with a high tensile strength.

DESCRIPTION OF EMBODIMENTS

Overview

Figure 1:
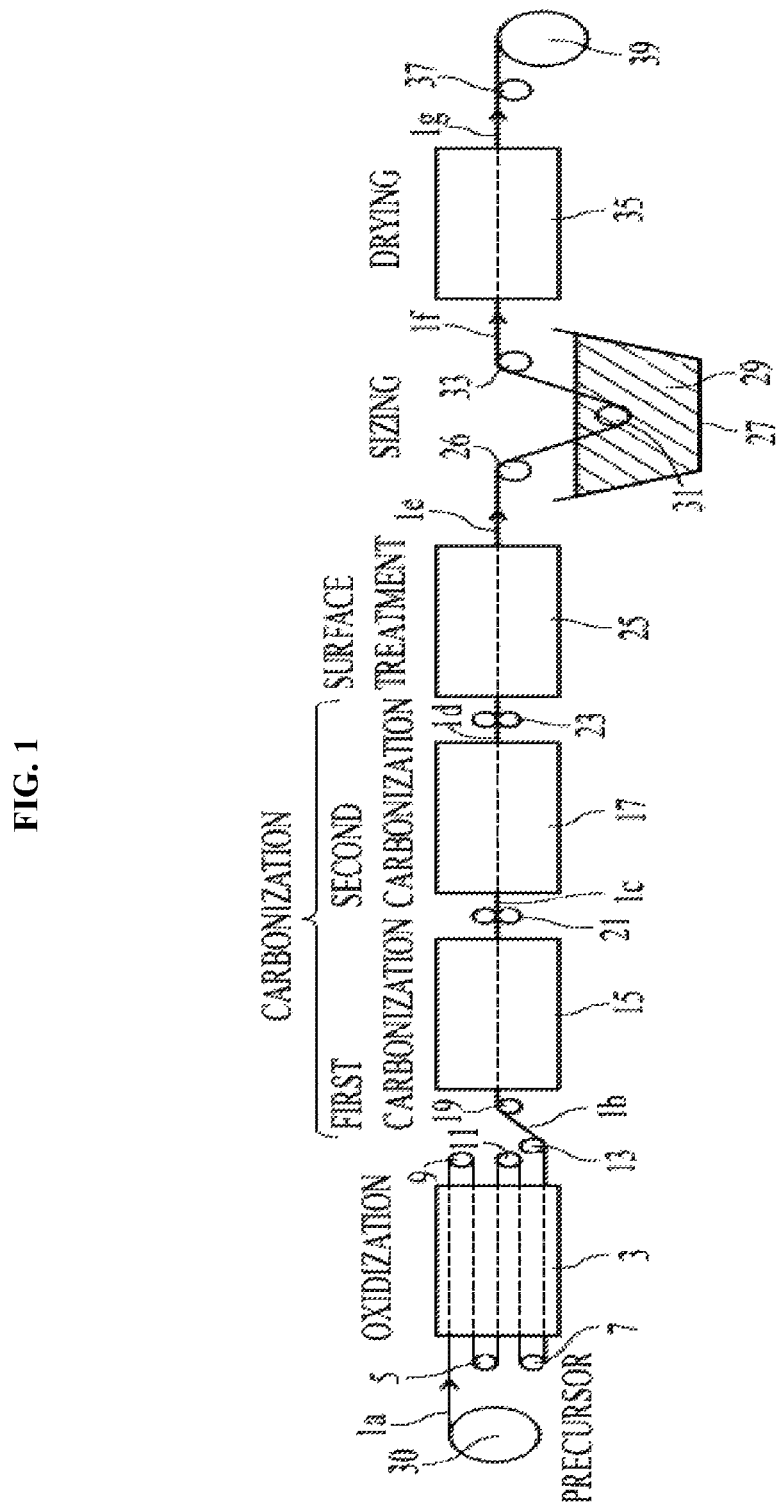
FIG. 1 is a schematic diagram showing processes for producing carbon fibers.

Focusing on the crystal structure of carbon fibers or specifically the crystal size, the inventors have noticed that carbonization (carbonization in a final carbonization process when multiple carbonization processes are performed) performed by heating with energy of, for example, microwaves or plasma can produce carbon fibers with a smaller crystal size than those produced through typical carbonization performed by heating with a heater. The inventors have also determined that such carbon fibers with a smaller crystal size have a higher tensile strength.

Microwave heating and plasma heating herein refer to heating of target fibers, which may be oxidized fibers (fibers before undergoing a single carbonization process) or fibers currently being carbonized (fibers before undergoing a final one of multiple carbonization processes), by applying energy to be converted to heat such as microwaves or plasma to the target fibers. Such microwave heating or plasma heating is performed by directly irradiating the target fibers with microwaves or plasma, or by feeding the target fibers through a carbonization furnace containing microwaves or plasma.

Heating with a heater refers to heating using a heater as a heat source of a carbonization furnace through which target fibers pass. This method heats target fibers as they pass through the atmosphere heated with the heater. This method is referred to as the conventional method.

Carbon fibers with characterizing crystal sizes and a method for producing such carbon fibers will now be described.

1. Carbon Fibers

Carbon fibers according to one embodiment satisfy the relationship represented by formula (1) below and one of the relationships represented by formulas (2) to (5) below.

$$La \geq 1 \quad (1),$$

$$La \leq -0.5 + 0.01 \times TM \text{ when } 170 \leq TM \leq 230 \quad (2),$$

$$La \leq -37.3 + 0.17 \times TM \text{ when } 230 < TM \leq 240 \quad (3),$$

$$La \leq -2.5 + 0.025 \times TM \text{ when } 240 < TM \leq 300 \quad (4), \text{ and}$$

$$La \leq 2 + 0.01 \times TM \text{ when } 300 < TM \quad (5)$$

In these formulas, La is the crystal size in nm in a direction parallel to the fiber axis measured with X-ray diffraction, and TM is the tensile modulus in GPa.

The carbon fibers satisfying the above relationship between the tensile modulus TM and the crystal size La have a higher tensile strength TS (elongation E) than carbon fibers having the same crystal size produced by heating with a heater.

Carbon fibers with the crystal size La smaller than 1 can have a lower tensile modulus TM and a lower tensile strength TS. Carbon fibers with the crystal size La greater than 12 tend to have a lower tensile strength TS (elongation E).

Carbon fibers according to another embodiment satisfy the relationships represented by formulas (6) and (7) below.

$$Lc \geq 1 \quad (6)$$

$$Lc \leq 0.4 + e^{(0.006 \times TM)} \quad (7)$$

In these formulas, Lc is the crystal size in nm in a direction perpendicular to the fiber axis measured with X-ray diffraction, and e is the base of the natural logarithm.

Carbon fibers satisfying the above relationship between the tensile modulus TM and the crystal size Lc have a higher tensile strength TS (elongation E) than carbon fibers having the same crystal size produced by heating with a heater.

Carbon fibers having the crystal size Lc smaller than 1 can have a lower tensile modulus TM and a lower tensile strength TS. Carbon fibers having the crystal size Lc greater than 20 can have their adjacent crystals easy to coalesce, and thus tend to have a lower tensile strength TS (elongation E).

The crystal sizes Lc and La are measured by, for example, a transmission method using an X-ray diffractometer (RINT-2000, Rigaku Co., Ltd.). Fibers are placed on a sample table, which is then mounted on the X-ray diffractometer. An X-ray used in the measurement is a CuKα beam generated under an accelerating voltage of 40 kV and a current of 30 mA. The sample is oriented to have the fiber axis of its fiber strand perpendicular to the equatorial plane during measurement of the crystal size Lc, and to have the fiber axis of its fiber strand parallel to the equatorial plane during measurement of the crystal size La. The diffraction angle 2θ is set in a diffraction pattern ranging from 10° to 60°, and a curve drawn near the angles of 10°, 20°, 35°, and 60° in the diffraction pattern is used as a baseline.

The crystal size Lc can be calculated using formula (11) below using the full width at half maximum β002 of the diffraction peak of the plane index 002 obtained with the above method.

$$\text{Crystal size } Lc(nm) = 0.9\lambda/(\beta 002 \cos \theta 002) \quad (11)$$

In this formula, λ is the wavelength of the X-ray, β002 is the full width at half maximum of the diffraction peak of the plane index 002, and θ002 is the diffraction angle of the plane index 002.

The crystal size La can be calculated using formula (12) below using the full width at half maximum β10 of the diffraction peak of the plane index 10 obtained with the above method.

$$\text{Crystal size } La(nm) = 0.9\lambda/(\beta 10 \cos \theta 10) \quad (12)$$

In this formula, λ is the wavelength of the X-ray, β10 is the full width at half maximum of the diffraction peak of the plane index 10, and θ10 is the diffraction angle of the plane index 10.

The lattice spacing d002 of a carbon net plane (described below) can be calculated using formula (13) below in accordance with the Bragg's Law.

$$\text{lattice spacing } d002(nm) = \lambda/(2 \sin \theta 002) \quad (13)$$

In this formula, λ is the wavelength of the X-ray, and θ002 is the diffraction angle of plane index 002. The tensile modulus TM is measured in accordance with JIS R 7606. The tensile strength TS and the elongation E are measured in accordance with JIS R 7606.

2. Production Method

A method for producing carbon fibers with the small crystal size described in 1. Carbon Fibers above will now be described.

The method will be described based on an example using acrylonitrile fibers as precursor fibers and oxidized fibers (conductive fibers) described below as target fibers.

(1) Carbon Fiber Production Processes

FIG. 1 is a schematic diagram showing carbon fiber production processes.

Carbon fibers are produced using precursor fibers, or a precursor. A single precursor is a strand (bundle) of a plurality of filaments, for example, 12,000 filaments. The precursor may also be referred to as a precursor fiber strand or a carbon fiber strand.

A precursor $1a$ is prepared in the manner described below. First, a spinning solution obtained by polymerization of monomers containing 90% or more by mass of acrylonitrile is spun into fibers using a wet spinning method or a dry-wet spinning method. Then, the fibers are washed, dried, and stretched. The resultant fibers serve as the precursor $1a$. Monomers to be copolymerized are selected from, for example, alkyl acrylate, alkyl methacrylate, acrylic acid, acrylamide, itaconic acid, and maleic acid.

The speed at which the precursor $1a$ is produced normally differs from the speed at which carbon fibers are produced by carbonizing the precursor $1a$. Thus, the produced precursor $1a$ is temporarily stored in a container or is wound on a bobbin.

As shown in FIG. 1, the precursor $1a$ is, for example, drawn from the bobbin 30 and is fed downstream. During this process, the precursor $1a$ undergoes various treatments, and is then wound on a bobbin 39 as carbon fibers.

As shown in FIG. 1, the carbon fibers are produced through an oxidization process of oxidizing the precursor $1a$, carbonization processes of carbonizing the fibers that have been oxidized (hereafter, oxidized fibers) $1b$ while the fibers are being stretched, a surface treatment process of improving the surface of fibers that have been carbonized (hereafter, carbonized fibers as appropriate) $1d$, a sizing process of coating such surface-improved fibers $1e$ with resin, and a drying process of drying such resin-coated fibers $1f$.

Dried fibers $1g$ are wound on the bobbin 39 as carbon fibers $1g$. Although fibers resulting from different processes are identified with letters (e.g., oxidized fibers $1b$), they may be referred to simply as fibers 1 when such identification is not used.

A treatment for oxidizing the precursor $1a$ is referred to as an oxidization treatment. A treatment for carbonizing the oxidized fibers $1b$ is referred to as a carbonization treatment. A treatment for improving the surface of the carbonized fibers $1d$ is referred to as a surface treatment. A treatment for coating the surface-improved fibers $1e$ with resin is referred to as a sizing treatment. A treatment for drying the resin-coated fibers $1f$ is referred to as a drying treatment.

The processes and the treatments will now be described.

(1)-1 Oxidization Process (Oxidization Treatment)

The oxidization process is performed using an oxidization oven 3 having an internal oxidizing atmosphere at 200 to 350° C. More specifically, the precursor $1a$ is oxidized as it passes through the air atmosphere inside the oxidization oven 3 one or multiple times. The oxidizing atmosphere may contain, for example, oxygen and nitrogen dioxide.

The precursor $1a$ during the oxidization process is stretched under predetermined tension for intended carbon fibers. The oxidization process is performed at the stretch ratio of, for example, 0.7 to 1.3. The precursor $1a$ is stretched using a plurality of rollers, e.g., two rollers 5 and 7 arranged at the entrance of the oxidization oven 3, or three rollers 9, 11, and 13 arranged at the exit of the oxidization oven 3.

(1)-2 Carbonization Processes (Carbonization Treatments)

The carbonization processes use heating (energizing) of the oxidized fibers $1b$ to cause pyrolysis and to achieve carbonization. Such carbonization is achieved by allowing the oxidized fibers $1b$ to pass through a first carbonization furnace 15, and then by allowing fibers $1c$, which have passed through the first carbonization furnace 15, to pass through a second carbonization furnace 17.

Carbonization performed in the first carbonization furnace 15 is referred to as first carbonization. A treatment performed in the first carbonization furnace 15 is referred to as a first carbonization treatment. A process performed in the first carbonization furnace 15 is referred to as a first carbonization process. The fibers $1c$, which have completed the first carbonization treatment or the first carbonization process (output from the first carbonization furnace 15), are referred to as fibers resulting from the first carbonization treatment or fibers currently being carbonized.

Similarly, carbonization performed in the second carbonization furnace 17 is referred to as second carbonization. A treatment performed in the second carbonization furnace 17 is referred to as a second carbonization treatment. A process performed in the second carbonization furnace 17 is referred to as a second carbonization process. The fibers $1d$, which have completed the second carbonization treatment or the second carbonization process (output from the second carbonization furnace 17), are referred to as fibers resulting from the second carbonization treatment or carbonized fibers.

The first carbonization uses heating with, for example, an electric heater, microwaves, or plasma. The second carbonization uses no electric heater, and uses either microwave magnetic field heating or plasma heating. When a plurality of carbonization processes are performed, carbonization performed in the final one of the processes uses microwave magnetic field heating or plasma heating. Microwave magnetic field heating refers to heating mainly using microwave magnetic field energy.

The second carbonization preferably uses heating with an inert gas atmosphere under a tensile force different from the tensile force in the first carbonization furnace 15. More specifically, the tensile force in the second carbonization process is preferably 1.0 to 5.0 times the tensile force in the first carbonization process. The inert gas may be nitrogen or argon.

The first carbonization furnace 15 and the second carbonization furnace 17 are independent of each other, with an adjustment unit for adjusting the tension of the fibers arranged between the carbonization furnaces 15 and 17. More specifically, a roller 19 is arranged at the entrance outside the first carbonization furnace 15. Rollers 21 are arranged between the first carbonization furnace 15 and the second carbonization furnace 17. Rollers 23 are arranged at the exit outside the second carbonization furnace 17.

The second carbonization process will now be described in detail later.

(1)-3 Surface Treatment Process (Surface Treatment)

The surface treatment process is performed by allowing the carbonized fibers $1d$ to pass through a surface treatment apparatus 25. A roller 26 is arranged at the exit outside the surface treatment apparatus 25. For the carbon fibers $1g$ used in forming a composite material, the surface treatment improves the affinity and adhesion between the carbon fibers $1g$ and a matrix resin.

The surface treatment is typically performed by oxidizing the surface of the carbonized fibers 1d. Examples of such surface treatment include liquid-phase and gas-phase treatment.

Industrial liquid-phase treatment may use chemical oxidation of the carbonized fibers 1d, which are immersed in an oxidizing agent, or may use electrolytic anodic oxidation of the carbonized fibers 1d, which are immersed in an electrolyte to which an electric current is applied. Gas-phase treatment may be performed by allowing the carbonized fibers 1d to pass through an oxidizing gas or by spraying active species occurring from an electrical discharge onto the carbonized fibers 1d.

(1)-4 Sizing Process (Sizing Treatment)

The sizing process is performed by allowing the surface-treated fibers 1e to pass through a liquid resin 29 contained in a resin bath 27. The sizing process improves the cohesion of the surface-treated fibers 1e.

In the sizing process, the surface-treated fibers 1e pass through the liquid resin 29, while their feeding direction is being changed using, for example, a plurality of rollers 31 and 33 arranged in or near the resin bath 27. The liquid resin 29 is, for example, either a solution or an emulsion prepared by mixing, for example, an epoxy resin, an urethane resin, a phenolic resin, a vinyl ester resin, or an unsaturated polyester resin in a solvent.

(1)-5 Drying Process (Drying Treatment)

The drying process is performed by allowing the fibers 1f to pass through a dryer 35. The dried fibers 1g are wound on the bobbin 39 via a roller 37 arranged outside and downstream from the dryer 35 (a winding process).

(2) Second Carbonization Process (2)-1 Microwave Magnetic Field Heating

Carbonization using microwave magnetic field heating will now be described.

In the second carbonization process, fibers 1c, which result from the first carbonization treatment through the first carbonization furnace 15, are heated using microwave magnetic field heating performed in the second carbonization furnace 17. The second carbonization process further carbonizes the fibers 1c resulting from the first carbonization treatment.

A microwave heating device used in this process may be designed to heat a target (fibers 1c resulting from the first carbonization treatment) using microwaves in a transmission mode TE10, which propagate from a microwave generator to a microwave heating furnace having a rectangular cross-section through a connecting waveguide.

Figure 2:
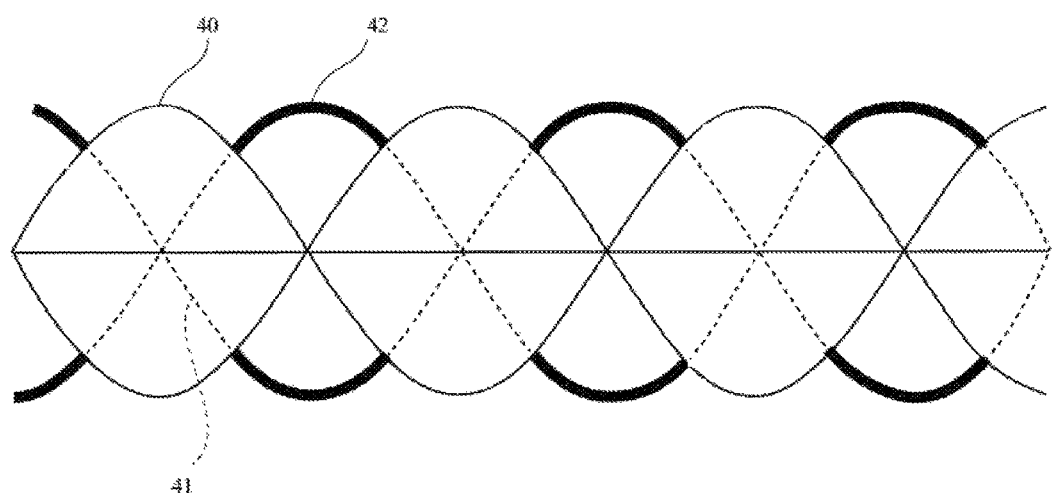
FIG. 2 is a diagram describing a standing wave of a microwave expressed in one plane.

The waveguide can have a short-circuiting load on its end to reflect microwaves to generate a standing wave as shown in FIG. 2. FIG. 2 is a diagram describing a standing wave of a microwave expressed in one plane. More specifically, an electric field and a magnetic field of a standing wave, which typically propagate in x-plane and y-plane respectively, are expressed in one plane in FIG. 2. In FIG. 2, for example, a solid line 40 indicates the distribution of an electric field propagating in x-plane, whereas a broken line 41 indicates the distribution of a magnetic field propagating in y-plane. A bold line 42 indicates a portion of the magnetic field distribution in which the magnetic field energy is greater than the electric field energy (magnetic field energy>electric field energy). This portion is used for heating.

The magnetic field energy used for heating may hereafter be referred to as heating magnetic field energy 42. In the present embodiment, the carbonization is performed by causing the fibers 1c resulting from the first carbonization treatment to pass through the heating magnetic field energy 42.

Carbon fibers in examples 1 to 3 and examples 6 to 8 in Table 1 shown below are produced using microwave magnetic field heating in the second carbonization.

(2)-2 Plasma Heating

Carbonization using plasma heating will now be described.

The second carbonization furnace 17 includes a plasma generator for generating plasma from an upper portion toward an inner portion of the body of the second carbonization furnace, an intake pipe and an exhaust pipe for creating an inert atmosphere inside the body of the second carbonization furnace. In this example, nitrogen is used as the inert gas. The plasma generator generates surface wave plasma with, for example, a slot antenna technique.

Carbon fibers in examples 4 and 5 in Table 1 shown below are produced using plasma heating performed in the second carbonization.

EXAMPLES

Example 1

Fibers currently being carbonized were further carbonized to produce carbon fibers. The fibers currently being carbonized are a conductive fiber strand of 3,000 fibers having a volume resistivity of 18 $\Omega \cdot cm$ resulting from the first carbonization treatment.

The fibers currently being carbonized were carbonized using microwave magnetic field heating. The output of microwaves used in the second carbonization furnace was 1.0 kW. The duration of irradiation was 32.4 sec. The pressure in the second carbonization furnace was maintained at 1.0 kPa in a nitrogen atmosphere.

Table 1 shows the tensile strength TS, the tensile modulus TM, the elongation E, the lattice spacing d002, the crystal size Lc, and the crystal size La of the resultant carbon fibers.

The crystal sizes Lc and La were measured by a transmission method using an X-ray diffractometer (RINT-2000, Rigaku Corporation). An X-ray used in the measurement is a $CuK\alpha$ beam generated under an accelerating voltage of 40 kV and a current of 30 mA. The sample was oriented to have the fiber axis of its fiber strand perpendicular to the equatorial plane during measurement of the crystal size Lc, and to have the fiber axis of its fiber strand parallel to the equatorial plane during measurement of the crystal size La. The diffraction angles 2θ was set in a diffraction pattern ranging from 10° to 60°, and a curve drawn near the angles of 10°, 20°, 35°, and 60° in the diffraction pattern was used as a baseline. The crystal size Lc was calculated using formula (11) below using the full width at half maximum β002 of the diffraction peak obtained with the above method. The crystal size La was calculated using formula (12) below using the full width at half maximum β10 of the diffraction peak obtained with the above method. The lattice spacing d002 was calculated using formula (13) below. The tensile modulus TM, the tensile strength TS, and the elongation E were measured in accordance with JIS R 7606.

Example 2

Fibers currently being carbonized as used in example 1 were carbonized using microwave magnetic field heating. The output of microwaves was 1.0 kW. The duration of irradiation was 10.8 sec. The pressure in the second carbonization furnace was maintained at 1.3 kPa in a nitrogen atmosphere.

Table 1 shows the tensile strength TS, the tensile modulus TM, the elongation E, the lattice spacing d002, the crystal size Lc, and the crystal size La of the resultant carbon fibers. The measurement was performed in the same manner as in example 1.

Example 3

Fibers currently being carbonized as used in example 1 were carbonized using microwave magnetic field heating. The output of microwaves was 2.5 kW. The duration of irradiation was 10.8 sec. The pressure in the second carbonization furnace was maintained at 1.5 kPa in a nitrogen atmosphere.

Table 1 shows the tensile strength TS, the tensile modulus TM, the elongation E, the lattice spacing d002, the crystal size Lc, and the crystal size La of the resultant carbon fibers. The measurement was performed in the same manner as in example 1.

Example 4

Fibers currently being carbonized as used in example 1 were carbonized using plasma heating. The output of microwaves for generating plasma was 0.5 kW. A magnetron oscillator was used for generating microwaves. The duration of irradiation of plasma was 80 sec. The pressure in the second carbonization furnace was maintained at 3.5 kPa in a nitrogen atmosphere.

Table 1 shows the tensile strength TS, the tensile modulus TM, the elongation E, the lattice spacing d002, the crystal size Lc, and the crystal size La of the resultant carbon fibers. The measurement was performed in the same manner as in example 1.

Example 5

Fibers currently being carbonized as used in example 1 were carbonized using plasma heating. The output of microwaves was 1.5 kW. The duration of irradiation of plasma was 50 sec. The pressure in the second carbonization furnace was maintained at 3.4 kPa in a nitrogen atmosphere.

Table 1 shows the tensile strength TS, the tensile modulus TM, the elongation E, the lattice spacing d002, the crystal size Lc, and the crystal size La of the resultant carbon fibers. The measurement was performed in the same manner as in example 1.

Example 6

Fibers having the tensile strength TS of 4400 MPa, the tensile modulus TM of 240 GPa, the lattice spacing d002 of 0.355 nm, the crystal size Lc of 1.8 nm, and the crystal size La of 3.6 nm as shown in Table 1 were used as the fibers currently being carbonized.

The fibers were carbonized using microwave magnetic field heating. The output of microwaves was 3 kW. The duration of irradiation was 320 sec. The pressure in the second carbonization furnace was maintained at 100 kPa in a nitrogen atmosphere.

Table 1 shows the tensile strength TS, the tensile modulus TM, the elongation E, the lattice spacing d002, the crystal size Lc, and the crystal size La of the resultant carbon fibers. The measurement was performed in the same manner as in example 1.

Example 7

The fibers used in example 6 were used as fibers currently being carbonized. The fibers were carbonized using microwave magnetic field heating. The output of microwaves was 4 kW. The duration of irradiation was 320 sec. The pressure in the second carbonization furnace was maintained at 100 kPa in a nitrogen atmosphere.

Table 1 shows the tensile strength TS, the tensile modulus TM, the elongation E, the lattice spacing d002, the crystal size Lc, and the crystal size La of the resultant carbon fibers. The measurement was performed in the same manner as in example 1.

Example 8

Fibers having the tensile strength TS of 5900 MPa, the tensile modulus TM of 290 GPa, the lattice spacing d002 of 0.350 nm, the crystal size Lc of 2.6 nm, and the crystal size La of 5.2 nm as shown in Table 1 were used as fibers currently being carbonized.

The fibers were carbonized using microwave magnetic field heating performed in a carbonization furnace. The output of microwaves was 5 kW. The duration of irradiation was 320 sec. The pressure in the second carbonization furnace was maintained at 100 kPa in a nitrogen atmosphere.

Tables 1 and 5 show the tensile strength TS, the tensile modulus TM, the elongation E, the lattice spacing d002, the crystal size Lc, and the crystal size La of the resultant carbon fibers. The measurement was performed in the same manner as in example 1.

COMPARATIVE EXAMPLES

Carbon fibers for evaluating the carbon fibers in the above examples were carbonized using conventional heating with a heater in a nitrogen atmosphere. Table 2 shows the tensile modulus TM, the crystal size Lc, and the crystal size La of the resultant carbon fibers. For comparison with the carbon fibers in examples 6 to 8, carbon fibers in comparative examples 6, 13, and 14 having the tensile modulus TM similar to or the same as that of the fibers in the examples will now be described.

Comparative Example 6

The fibers used in example 1 were used as fibers currently being carbonized. The fibers were carbonized using heating with a heater in a carbonization furnace. The temperature in the second carbonization furnace was 1400° C., and the duration of heating was 240 sec. The pressure in the second carbonization furnace was maintained at 100 kPa in a nitrogen atmosphere.

Table 3 shows the heating conditions for the resultant carbon fibers and the properties of the heated carbon fibers. The measurement was performed in the same manner as in example 1.

Comparative Example 13

The fibers used in examples 6 and 7 were used as fibers currently being carbonized. The fibers were carbonized using heating with a heater. The temperature in the second carbonization furnace was 2200° C., and the duration of heating was 450 sec. The second carbonization furnace was maintained at 100 kPa in a nitrogen atmosphere.

Table 4 shows the heating conditions for the resultant carbon fibers and the properties of the heated carbon fibers. The measurement was performed in the same manner as in example 1.

Comparative Example 14

The fibers used in example 8 were used as fibers currently being carbonized as shown in Table 5. The fibers were carbonized using heating with a heater. The temperature in the second carbonization furnace was 2400° C., and the duration of heating was 600 sec. The pressure in the second carbonization furnace was maintained at 100 kPa in a nitrogen atmosphere.

Table 5 shows the heating conditions for the resultant carbon fibers and the properties of the heated carbon fibers. The measurement was performed in the same manner as in example 1.

Table 1 summarizes the results for the carbon fibers in the examples through the second carbonization process using plasma heating or microwave magnetic field heating.

Table 2 summarizes the results for the carbon fibers in the above comparative examples produced with the conventional method for evaluating the tensile properties.

To evaluate the tensile properties, the carbon fibers in the examples and the comparative examples each having similar or the same tensile modulus TM will be discussed. More specifically, three types of carbon fibers having the tensile modulus TM of 240, 350, and 430 GPa respectively will now be discussed.

Table 3 shows the results for the carbon fibers in example 6 in comparison with the carbon fibers in comparative example 6.

Table 4 shows the results for the carbon fibers in example 7 in comparison with the carbon fibers in comparative example 13.

Table 5 shows the results for the carbon fibers in example 8 in comparison with the carbon fibers in comparative example 14.

TABLE 1

|  |  | Example1 | Example2 | Example3 | Example4 | Example5 | Example6 | Example7 | Example8 |
|---|---|---|---|---|---|---|---|---|---|
| Starting material fibers | Tensile strength TS (MPa) | — | — | — | — | — | 4400 | 4400 | 5900 |
|  | Tensile modulus TM (GPa) | — | — | — | — | — | 240 | 240 | 290 |
|  | Lattice spacing d002 (nm) | — | — | — | — | — | 0.355 | 0.355 | 0.350 |
|  | Crystal size Lc (nm) | — | — | — | — | — | 1.8 | 1.8 | 2.6 |
|  | Crystal size La (nm) | — | — | — | — | — | 3.6 | 3.6 | 5.2 |
| Heating conditions | Method | Magnetic field heating | Magnetic field heating | Magnetic field heating | Plasma heating | Plasma heating | Magnetic field heating | Magnetic field heating | Magnetic field heating |
|  | Temperature or output | 1.0 kW | 1.0 kW | 2.5 kW | 0.5 kW | 1.5 kW | 3 kW | 4 kW | 5 kW |
|  | Duration of heating (sec) | 32.4 | 10.8 | 10.8 | 80 | 50 | 320 | 320 | 320 |
|  | Pressure (kPa) | 1.0 | 1.3 | 1.5 | 3.5 | 3.4 | 100 | 100 | 100 |
| Heated fibers | Tensile strength TS (MPa) | 3200 | 3500 | 3900 | 3900 | 4300 | 5200 | 6500 | 5900 |
|  | Tensile modulus TM (GPa) | 220 | 200 | 220 | 210 | 230 | 250 | 320 | 430 |
|  | Elongation E (%) | 1.5 | 1.8 | 1.8 | 1.9 | 1.9 | 2.1 | 2.0 | 1.4 |
|  | Lattice spacing d002 (mn) | 0.353 | 0.354 | 0.357 | 0.357 | 0.359 | 0.360 | 0.352 | 0.350 |
|  | Crystal size Lc (nm) | 1.6 | 1.3 | 1.5 | 1.2 | 1.4 | 1.5 | 2.5 | 4.8 |
|  | Crystal size La (nm) | 1.5 | 1.3 | 1.5 | 1.3 | 1.4 | 1.5 | 3.2 | 6.2 |

TABLE 2

|  | Tensile modulus TM (GPa) | Crystal size Lc (nm) | Crystal size La (nm) |
|---|---|---|---|
| Comparative Example1 | 170 | 1.3 | 1.2 |
| Comparative Example2 | 190 | 1.4 | 1.5 |
| Comparative Example3 | 200 | 1.4 | 1.5 |
| Comparative Example4 | 235 | 1.8 | 3.5 |
| Comparative Example5 | 240 | 1.8 | 4.3 |
| Comparative Example6 | 240 | 1.8 | 3.6 |
| Comparative Example7 | 245 | 2.1 | 5.5 |
| Comparative Example8 | 290 | 2.6 | 7.6 |
| Comparative Example9 | 300 | 3.4 | 5.4 |
| Comparative Example10 | 310 | 3.2 | 10.2 |
| Comparative Example11 | 320 | 4.0 | 12.2 |
| Comparative Example12 | 330 | 4.0 | 6.2 |
| Comparative Example13 | 350 | 3.6 | 9.1 |
| Comparative Example14 | 430 | 6.0 | 9.9 |

TABLE 3

|  |  | Example6 | Comparative Example6 |
|---|---|---|---|
| Starting material fibers | Tensile strength TS (MPa) | 4400 | — |
|  | Tensile modulus TM (GPa) | 240 | — |
|  | Lattice spacing d002 (nm) | 0.355 | — |
|  | Crystal size Lc (nm) | 1.8 | — |
|  | Crystal size La (nm) | 3.6 | — |
| Heating conditions | Method | Magnetic field heating | Heating with heater |
|  | Temperature or output | 3 kW | 1400° C. |
|  | Duration of heating (sec) | 320 | 240 |
|  | Pressure (kPa) | 100 | 100 |

TABLE 3-continued

|  |  | Example 6 | Comparative Example 6 |
|---|---|---|---|
| Heated fibers | Tensile strength TS (MPa) | 5200 | 4400 |
|  | Tensile modulus TM (GPa) | 250 | 240 |
|  | Elongation E (%) | 2.1 | 1.8 |
|  | Density D (g/cm³) | 1.77 | 1.77 |
|  | Lattice spacing d002 (nm) | 0.360 | 0.355 |
|  | Crystal size Lc (nm) | 1.5 | 1.8 |
|  | Crystal size La (nm) | 1.5 | 3.6 |

TABLE 4

|  |  | Example 7 | Comparative Example 13 |
|---|---|---|---|
| Starting material fibers | Tensile strength TS (MPa) | 4400 | 4400 |
|  | Tensile modulus TM (GPa) | 240 | 240 |
|  | Lattice spacing d002 (nm) | 0.355 | 0.355 |
|  | Crystal size Lc (nm) | 1.8 | 1.8 |
|  | Crystal size La (nm) | 3.6 | 3.6 |
| Heating conditions | Method | Magnetic field heating | Heating with heater |
|  | Temperature or output | 4 kW | 2200° C. |
|  | Duration of heating (sec) | 320 | 450 |
|  | Pressure (kPa) | 100 | 100 |
| Heated fibers | Tensile strength TS (MPa) | 6500 | 3300 |
|  | Tensile modulus TM (GPa) | 320 | 350 |
|  | Elongation E (%) | 2.0 | 0.9 |
|  | Density D (g/cm³) | 1.78 | 1.80 |
|  | Lattice spacing d002 (nm) | 0.352 | 0.351 |
|  | Crystal size Lc (nm) | 2.5 | 3.6 |
|  | Crystal size La (nm) | 3.2 | 9.1 |

TABLE 5

|  |  | Example 8 | Comparative Example 14 |
|---|---|---|---|
| Starting material fibers | Tensile strength TS (MPa) | 5900 | 5900 |
|  | Tensile modulus TM (GPa) | 290 | 290 |
|  | Lattice spacing d002 (nm) | 0.350 | 0.350 |
|  | Crystal size Lc (nm) | 2.6 | 2.6 |
|  | Crystal size La (nm) | 5.2 | 5.2 |
| Heating conditions | Method | Magnetic field heating | Heating with heater |
|  | Temperature or output | 5 kW | 2400° C. |
|  | Duration of heating (sec) | 320 | 600 |
|  | Pressure (kPa) | 100 | 100 |
| Heated fibers | Tensile strength TS (MPa) | 5900 | 4600 |
|  | Tensile modulus TM (GPa) | 430 | 430 |
|  | Elongation E (%) | 1.4 | 1.1 |
|  | Density D (g/cm³) | 1.79 | 1.80 |
|  | Lattice spacing d002 (nm) | 0.350 | 0.349 |
|  | Crystal size Lc (nm) | 4.8 | 6 |
|  | Crystal size La (nm) | 6.2 | 9.9 |

4. Tensile Properties

The crystal size and the tensile properties (including elongation) will now be described.

(1) Crystal Sizes Lc and La and Tensile Modulus TM

Figure 3:
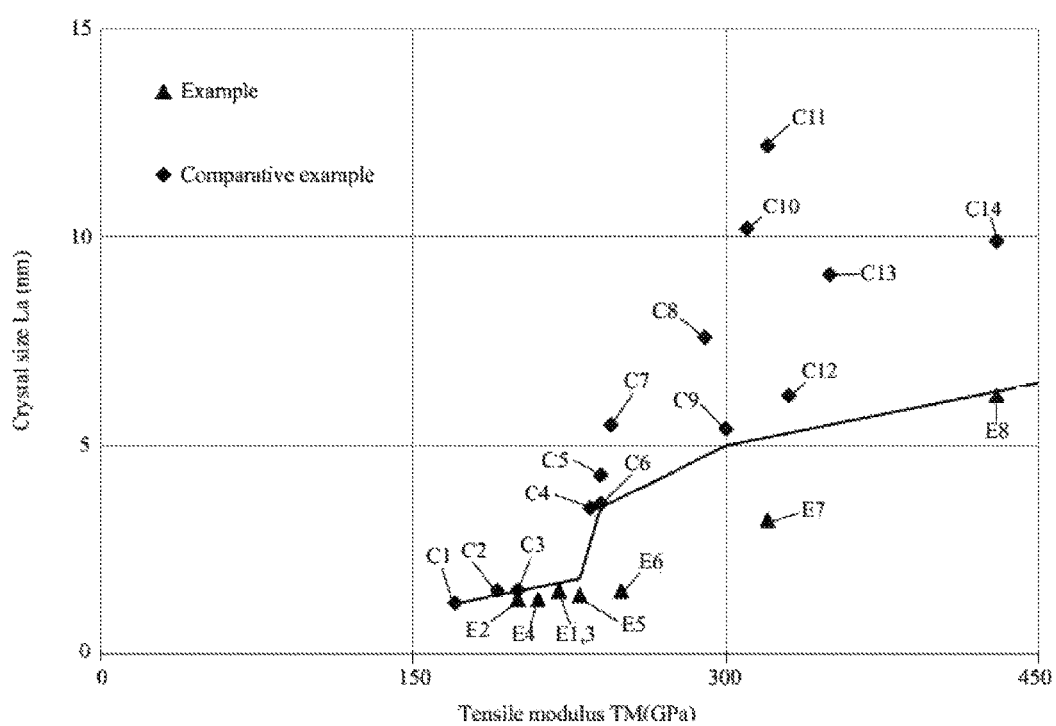
FIG. 3 is a graph showing the relationship between the crystal size La and the tensile modulus TM of carbon fibers.
Figure 4:
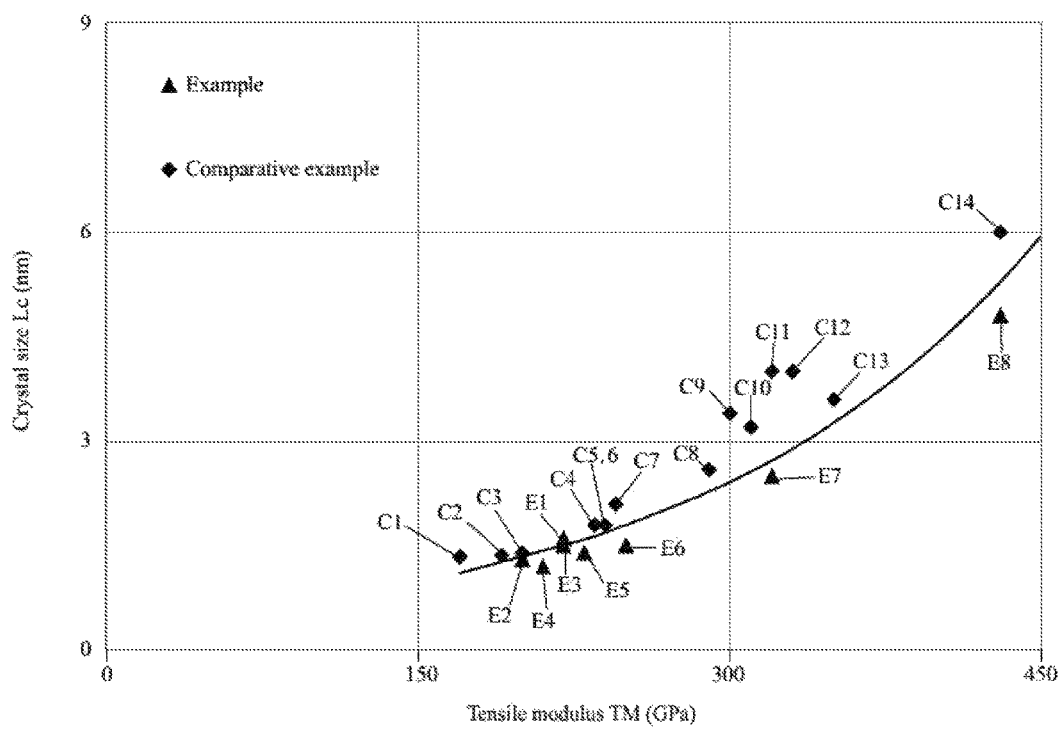
FIG. 4 is a graph showing the relationship between the crystal size Lc and the tensile modulus TM of carbon fibers.

FIG. 3 is a graph showing the relationship between the crystal size La and the tensile modulus TM of carbon fibers in examples 1 to 8 and comparative examples 1 to 14. FIG. 4 is a graph showing the relationship between the crystal size Lc and the tensile modulus TM of carbon fibers in examples 1 to 8 and comparative examples 1 to 14. In FIGS. 3 and 4, for example, "E1" refers to example 1, and "C1" refers to comparative example 1.

As shown in FIGS. 3 and 4, the carbon fibers in examples 1 to 8 have the crystal sizes Lc and La smaller than the crystal sizes Lc and La of the carbon fibers in comparative examples 1 to 14 when these different types of carbon fibers have similar or the same tensile modulus TM. In other words, when having similar or the same crystal sizes Lc and La, the carbon fibers in examples 1 to 8 have a higher tensile modulus TM than the carbon fibers in comparative examples 1 to 14. This tendency is notable particularly for the crystal size La shown in FIG. 3. This reveals that the conventional method cannot produce carbon fibers having a small crystal size La and a high tensile modulus TM.

In FIG. 3, comparative examples 1 to 8 and examples 1 to 14 have a distinctive boundary between them. The ranges defined by examples 1 to 8 are written using the formulas below in correspondence with the tensile modulus TM. These are the above formulas (2) to (5).

$$La \leq -0.5 + 0.01 \times TM \text{ when } 170 \leq TM \leq 230 \quad (2),$$

$$La \leq -37.3 + 0.17 \times TM \text{ when } 230 < TM \leq 240 \quad (3),$$

$$La \leq -2.5 + 0.025 \times TM \text{ when } 240 < TM \leq 300 \quad (4), \text{ and}$$

$$La \leq 2 + 0.01 \times TM \text{ when } 300 < TM \quad (5)$$

In other words, carbon fibers satisfying the above relationships have a high tensile strength TS (elongation E) as described below.

In FIG. 4, comparative examples 1 to 8 and examples 1 to 14 have a distinctive boundary between them. The ranges defined by examples 1 to 8 are written using the formulas below in correspondence with the tensile modulus TM. This is the above formula 7.

$$Lc \leq 0.4 + e^{(0.006 \times TM)} \quad (7)$$

In the formula, e is the base of the natural logarithm.

(2) Tensile Strength (Elongation)

Figure 5:
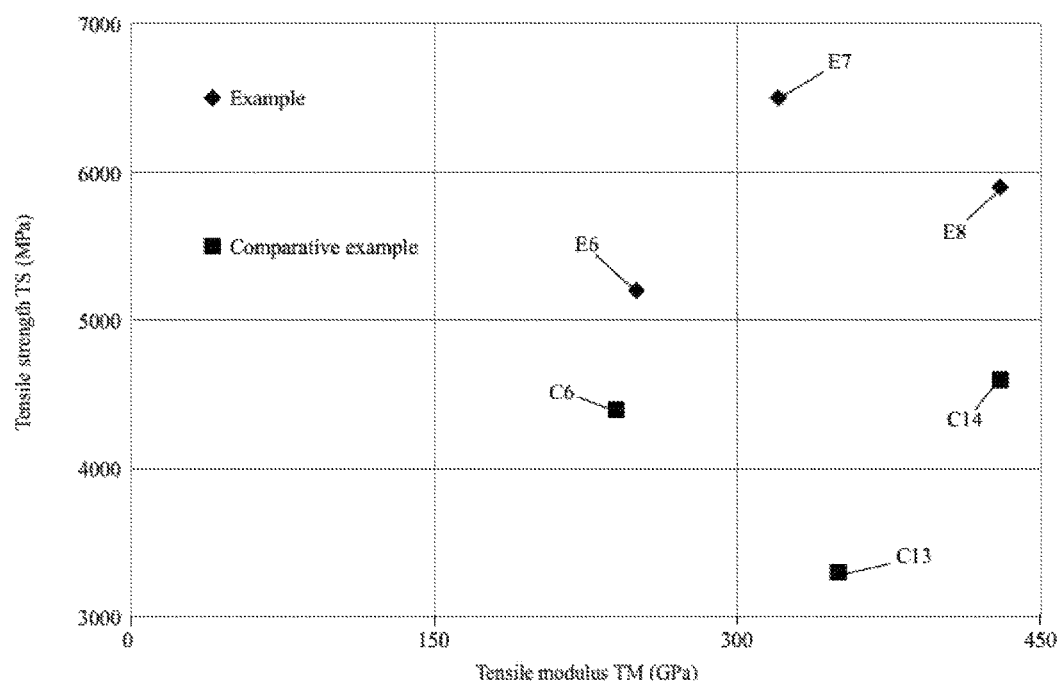
FIG. 5 is a graph showing the relationship between the tensile modulus TM and the tensile strength TS of carbon fibers in examples and comparative examples.
Figure 6:
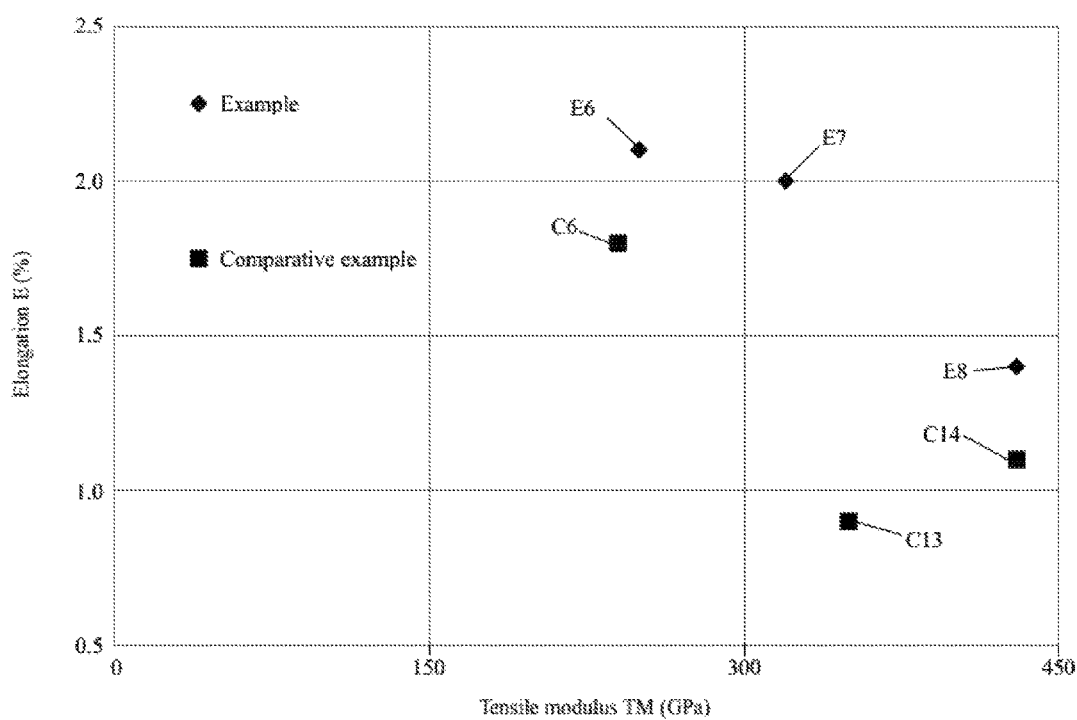
FIG. 6 is a graph showing the relationship between the tensile modulus TM and the elongation E of the carbon fibers in the examples and the comparative examples.

FIG. 5 is a graph showing the relationship between the tensile modulus TM and the tensile strength TS in examples 6 to 8 and comparative examples 6, 13, and 14. FIG. 6 is a graph showing the relationship between the tensile modulus TM and the elongation E in examples 6 to 8 and comparative examples 6, 13, and 14.

As shown in FIGS. 5 and 6, the tensile strength TS and the elongation E in examples 6 to 8 are higher than those in comparative examples 6, 13, and 14. This will be described in detail.

(2)-1 Example 6 and Comparative Example 6 (Table 3)

When the tensile modulus TM is 240 GPa, the tensile strength TS is 4400 MPa and the elongation E is 1.8% in comparative example 6. In example 6, the tensile modulus TM is 250 GPa, which is slightly higher than in comparative example 6, and the tensile strength TS is 5200 MPa, and the elongation E is 2.1%. In this manner, the tensile strength TS and the elongation E are higher in example 6 than in comparative example 6.

(2)-2 Example 7 and Comparative Example 13 (Table 4)

When the tensile modulus TM is 350 GPa, the tensile strength TS is 3300 MPa and the elongation E is 0.9% in comparative example 13. In example 7, the tensile modulus TM is 320 GPa, which is slightly lower than in comparative example 13, and the tensile strength TS is 6500 MPa and the elongation E is 2.0%. In this manner, the tensile strength TS and the elongation E are higher in example 7 than in comparative example 13.

(2)-3 Example 8 and Comparative Example 14 (Table 5)

When the tensile modulus TM is 430 GPa, the tensile strength TS is 4600 MPa and the elongation E is 1.1% in comparative example 14. In example 8, the tensile modulus TM is the same, and the tensile strength TS is 5900 MPa and the elongation E is 1.4%. In this manner, the tensile strength TS and the elongation E are higher in example 8 than in comparative example 14.

(2)-4 Summary

As described above, the carbon fibers having the crystal sizes Lc and La in the specific ranges and the tensile modulus TM in the specific range have a high tensile strength TS and a high elongation E that cannot be achieved by the conventional method.

(3) Lattice Spacing of a Graphitic Carbon Layer and Density of a Carbon Fiber

Figure 7:
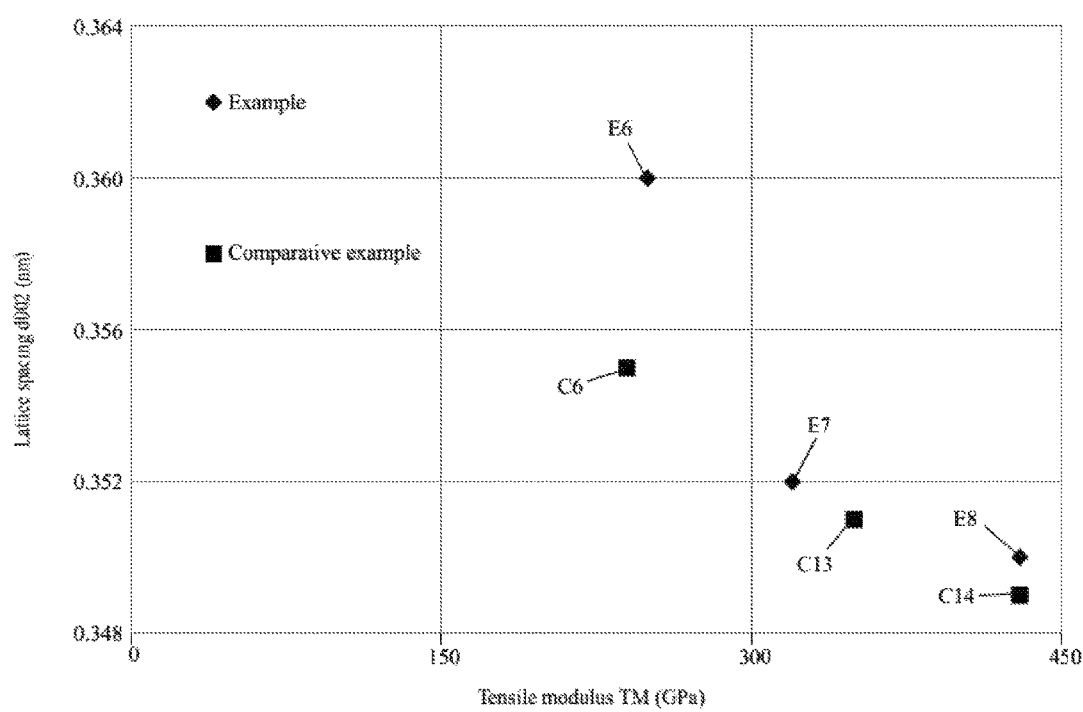
FIG. 7 is a graph showing the relationship between the tensile modulus TM and the lattice spacing d002 of the carbon fibers in the examples and the comparative examples.
Figure 8:
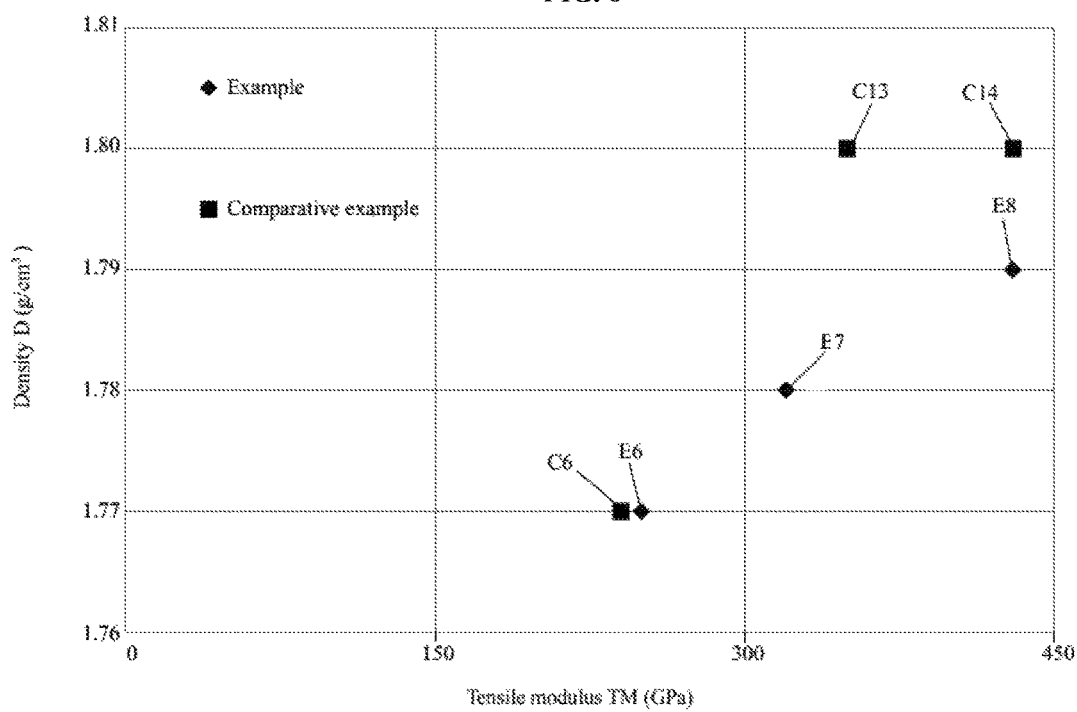
FIG. 8 is a graph showing the relationship between the tensile modulus TM and the density D of the carbon fibers in the examples and the comparative examples.

FIG. 7 is a graph showing the relationship between the tensile modulus TM and the lattice spacing d002 in examples 6 to 8 and comparative examples 6, 13, and 14. FIG. 8 is a graph showing the relationship between the tensile modulus TM and the density D in examples 6 to 8 and comparative examples 6, 13, and 14.

As shown in FIG. 7, the lattice spacing d002 is larger in examples 6 to 8 than in comparative examples 6, 13, and 14 using the conventional method. The density D is smaller in examples 6 to 8 than in comparative examples 6, 13, and 14 as shown in FIG. 8. When having the same tensile modulus TM and the same tensile strength TS, the fibers with a smaller density D have a higher specific modulus of elasticity and a higher specific intensity. This will be described in detail.

(3)-1 Example 6 and Comparative Example 6 (Table 3)

When the tensile modulus TM is 240 GPa, the lattice spacing d002 is 0.355 nm and the density D is 1.77 g/cm$^3$ in comparative example 6. In example 6, the tensile modulus TM is 250 GPa, which is slightly higher than in comparative example 6, and the lattice spacing d002 is 0.360 nm and the density D is 1.77 g/cm$^3$.

In this manner, although the tensile modulus TM is higher in example 6 than in comparative example 6, the lattice spacing d002 is greater in example 6 than in comparative example 6. Typically, the density decreases as the lattice spacing d002 increases.

The density D is the same in example 6 and in comparative example 6. Typically, the density D decreases as the tensile modulus TM decreases. The tensile modulus TM is higher in example 6 than in comparative example 6. Based on this, the density of carbon fibers in example 6 is substantially smaller than the density of carbon fibers with the same tensile modulus TM produced by the conventional method.

(3)-2 Example 7 and Comparative Example 13 (Table 4)

When the tensile modulus TM is 350 GP, the lattice spacing d002 is 0.351 nm and the density D is 1.80 g/cm$^3$ in comparative example 13. In example 7, the tensile modulus TM is 320 GPa, which is slightly lower than in comparative example 13, and the lattice spacing d002 is 0.352 nm and the density D is 1.78 g/cm$^3$. In this manner, the lattice spacing d002 is greater in example 7 than in comparative Example 13, and the density D is smaller in example 7 than in comparative example 13.

(3)-3 Example 8 and Comparative Example 14 (Table 5)

When the tensile modulus TM is 430 GPa, the lattice spacing d002 is 0.349 nm and the density D is 1.80 g/cm$^3$ in comparative example 14. In example 8, the lattice spacing d002 is 0.350 nm and the density D is 1.79 g/cm$^3$. In this manner, the lattice spacing d002 is greater in example 8 than in comparative example 14, and the density D is smaller in example 8 than in comparative example 14.

(4)-4 Target Fibers

As shown in Tables 3 and 4, the same target fibers are used in examples 6 and 7 and comparative example 13. The target fibers are the carbon fibers in comparative example 6 shown in Table 3 produced by the conventional method. As shown in Tables 3 and 4, the target fibers have the crystal size Lc of 1.8 nm and the crystal size La of 3.6 nm.

In example 6, the crystal size Lc is 1.5 nm, and the crystal size La is 1.5 nm. In example 7, the crystal size Lc is 2.5 nm, and the crystal size La is 3.2 nm.

The crystal size La (1.5) of the carbon fibers in example 6 and the crystal size La (3.2) of the carbon fibers in example 7 are smaller than the crystal size La (3.6) of the target fibers.

In this manner, the use of microwave magnetic field heating enables carbon fibers produced by the conventional method, which are used as the target fibers, to be processed into carbon fibers with a new structure having the small crystal size La.

In comparative example 13, the crystal size Lc is 3.6 nm and the crystal size La is 9.1 nm, and the crystal sizes Lc and La are larger than the crystal sizes Lc and La of the target fibers.

In this manner, when carbon fibers used as the target fibers are carbonized by the conventional method, the resultant carbon fibers cannot have the crystal sizes Lc and La smaller than those of the target fibers.

5. Number of Microwave Heating Times

The effect of the number of times microwave magnetic field heating is performed (hereafter also referred to as the number of magnetic field treatment times) on the crystal size and the tensile properties will now be described.

Figure 9:
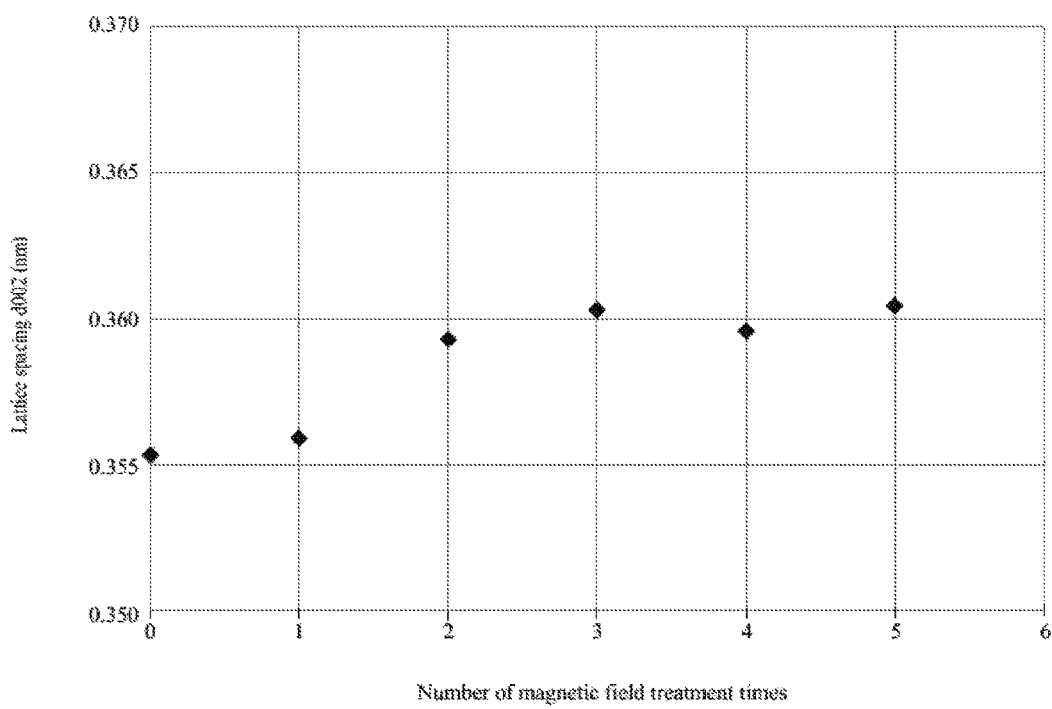
FIG. 9 is a graph showing the relationship between the number of magnetic field treatment times and the lattice spacing d002.
Figure 10:
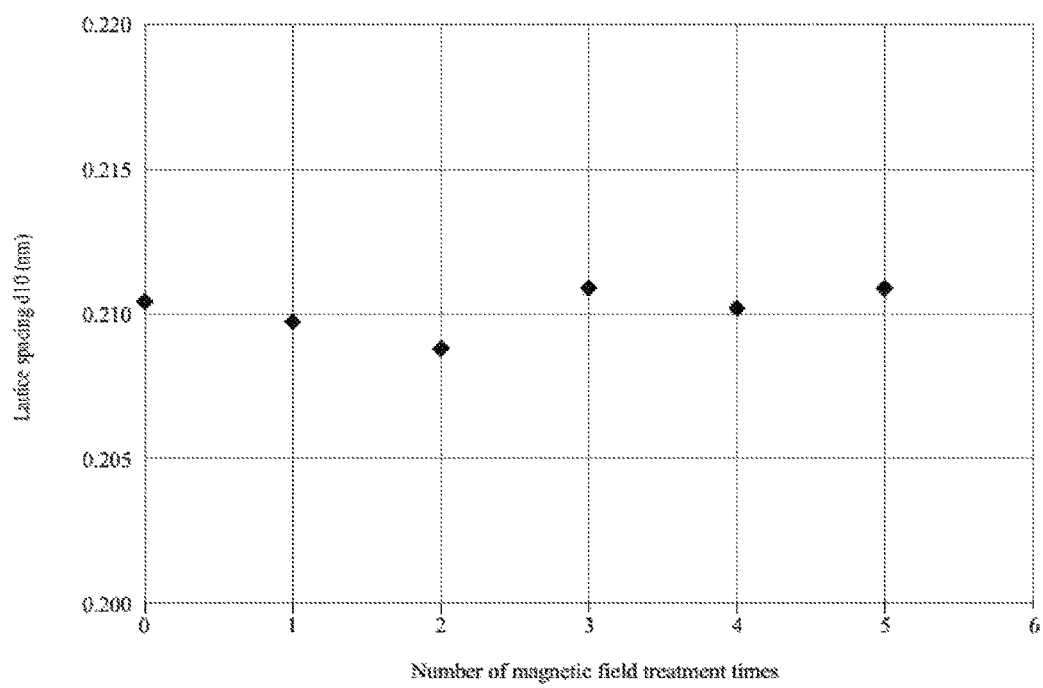
FIG. 10 is a graph showing the relationship between the number of magnetic field treatment times and the lattice spacing d10.
Figure 11:
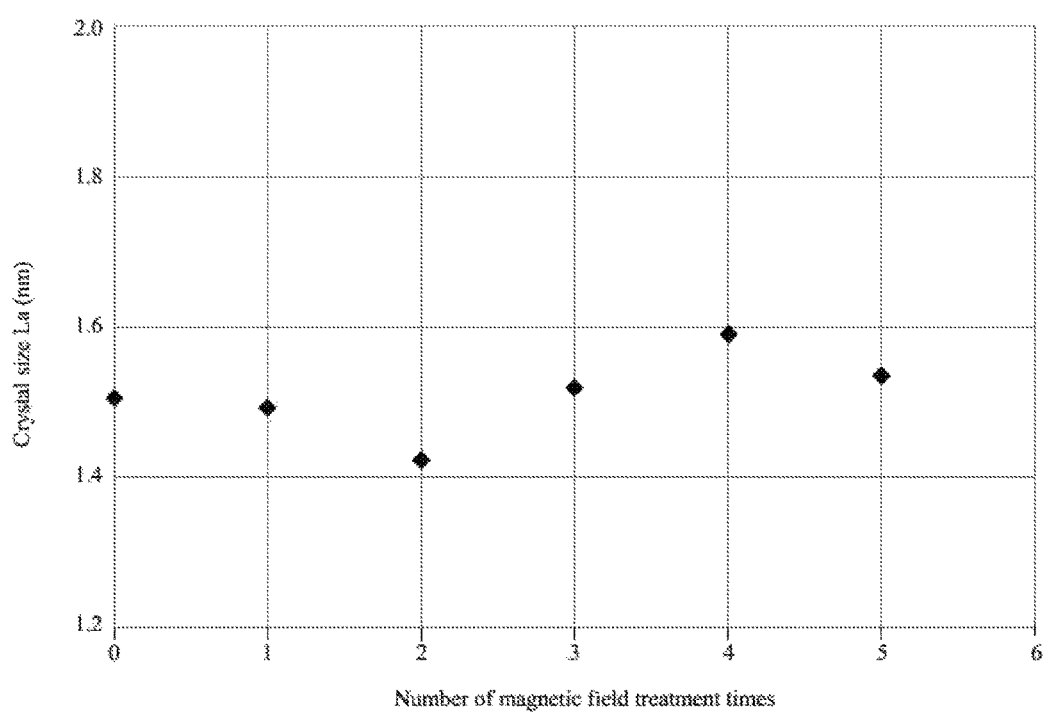
FIG. 11 is a graph showing the relationship between the number of magnetic field treatment times and the crystal size La.
Figure 12:
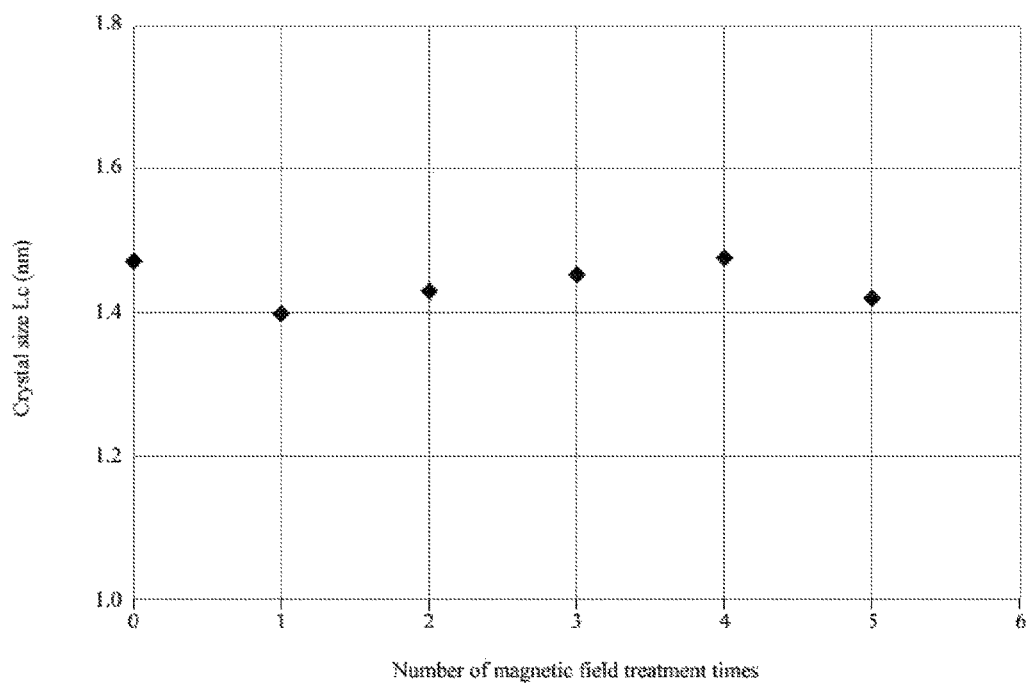
FIG. 12 is a graph showing the relationship between the number of magnetic field treatment times and the crystal size Lc.
Figure 13:
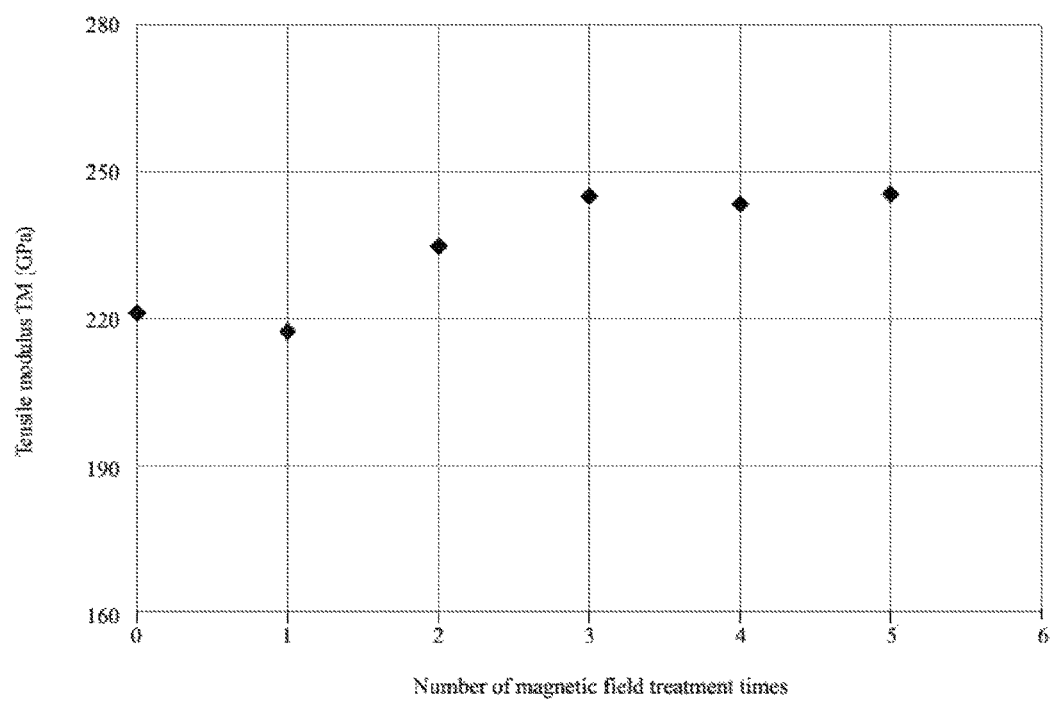
FIG. 13 is a graph showing the relationship between the number of magnetic field treatment times and the tensile modulus TM.
Figure 14:
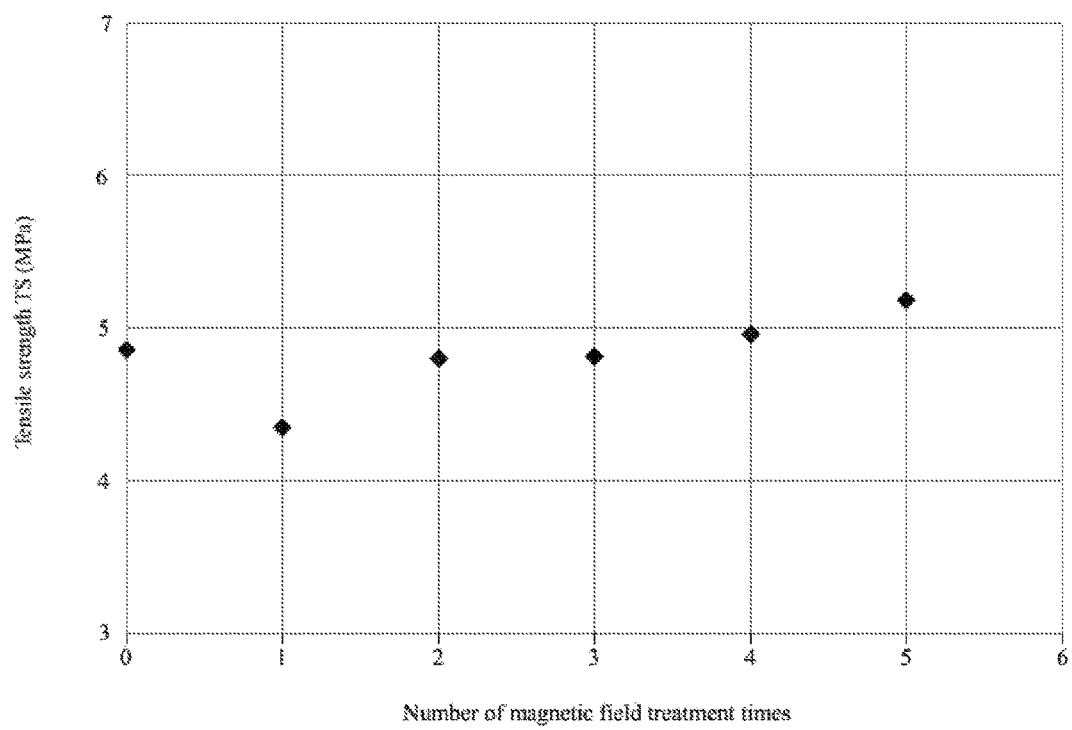
FIG. 14 is a graph showing the relationship between the number of magnetic field treatment times and the tensile strength TS.

FIG. 9 is a graph showing the relationship between the number of magnetic field treatment times and the lattice spacing d002. FIG. 10 is a graph showing the relationship between the number of magnetic field treatment times and the lattice spacing d10 of a crystal plane along an axis of a graphitic carbon. FIG. 11 is a graph showing the relationship between the number of magnetic field treatment times and the crystal size La. FIG. 12 is a graph showing the relationship between the number of magnetic field treatment times and the crystal size Lc. FIG. 13 is a graph showing the relationship between the number of magnetic field treatment times and the tensile modulus TM. FIG. 14 is a graph showing the relationship between the number of magnetic field treatment times and the tensile strength TS.

The magnetic field treatment was performed under the conditions below. The output of microwaves was 3 kW. The target fibers were fed through the furnace at 0.1 m/min. The duration of irradiation was 30 sec.

As shown in FIGS. 9, 11 and 12, the lattice spacing d002 and the crystal sizes La and Lc tend to increase as the number of treatment times increases. As shown in FIG. 10, the lattice spacing d10 is substantially constant irrespective of the number of treatment times. As shown in FIGS. 13 and 14, the tensile modulus TM and the tensile strength TS tend to increase as the crystal sizes La and Lc increase.

This reveals that repeated microwave heating seems to increase the crystal sizes La and Lc, and to improve the tensile properties. The number of treatment times was the number of processes performed under the same conditions including the microwave output and the duration of irradiation.

6. Breakage During Carbonization Process (Reference Example)

When oxidized fibers or fibers currently being carbonized are carbonized using a conventional electric heater, the entire carbonization furnace needs to be heated, and the oxidized fibers or the fibers currently being carbonized are heated inefficiency (have low heating efficiency). Further, the oxidized fibers and the fibers currently being carbonized receive heat in the carbonization furnace that transmits gradually from external portions to internal portions of the fibers. This increases the time taken for carbonization (causes prolonged carbonization).

One method for solving this issue of low heating efficiency or prolonged carbonization in heating with an electric heater is to directly heat the oxidized fibers using, for example, microwave electric field heating with microwaves (e.g., Japanese Examined Patent Publication No. 47-24186).

However, with this technique, conductive fibers can break under an intense electric discharge that may occur between the waveguide and the glowing conductive fibers, or between the glowing conductive fibers and a carbonized carbonaceous material after tar as a by-product from the carbonization reaction of precursor fibers is adhered to the quartz tube.

In response to this issue, microwave magnetic field heating for carbonization seemingly allows conductive materials such as conductive fibers to be carbonized without breakage.

A method for carbonizing conductive materials such as conductive fibers without breakage, and a method for producing such carbonized materials will now be described as a reference example. This method can be used for carbon films obtained through carbonization of conductive materials, such as conductive films, in addition to being used for conductive fibers.

(1) Overview

The carbonization method according to the present example carbonizes conductive materials using microwave magnetic field heating. Thus, the conductive materials, such as conductive fibers, are less likely to be affected by a microwave electric field, and are carbonized without breakage.

The microwave magnetic field heating is performed under magnetic field energy greater than electric field energy in a standing wave (refer to FIG. 2). This enables more efficient carbonization of conductive materials such as conductive fibers without breakage.

The conductive material has a volume resistivity of 100,000 Ω·cm or less. This enables more efficient carbonization of conductive materials such as conductive fibers without breakage.

Further, the method for producing carbonized materials includes the carbonization process for carbonizing conductive materials. The carbonization process is implemented by the carbonization method described above. This enables carbonized materials, such as carbonized fibers, to be produced efficiently without breakage.

The method according to the reference example is the carbonization method (carbonization process), and other processes such as an oxidization process are described in 2. Production Method. The carbonization method (carbonization process) will now be described with reference to FIGS. 1 and 2.

(2) Carbonization Process (Carbonization Treatment)

The carbonization process carbonizes oxidized fibers $1b$ by causing pyrolysis reaction by heating. The carbonization is performed by allowing the oxidized fibers $1b$ to pass through the first carbonization furnace 15 and further the fibers $1c$, which have passed through the first carbonization furnace 15, to pass through the second carbonization furnace 17.

As described above, carbonization performed in the first carbonization furnace 15 is referred to as first carbonization, the treatment performed in the first carbonization furnace 15 is referred to as the first carbonization treatment, the process performed in the first carbonization furnace 15 is referred to as the first carbonization process, and the fibers $1c$, which have completed the first carbonization treatment or the first carbonization process (output from the first carbonization furnace 15), are referred to as the fibers resulting from the first carbonization treatment.

In the same manner, as described above, carbonization performed in the second carbonization furnace 17 is referred to as second carbonization, a carbonization treatment performed in the second carbonization furnace 17 is referred to as a second carbonization treatment, a process performed in the second carbonization furnace 17 is referred to as a second carbonization process, and the fibers $1d$, which have completed the second carbonization treatment or the second carbonization process (output from the second carbonization furnace 17), are referred to as fibers resulting from the second carbonization treatment or carbonized fibers.

The carbonization method for carbonizing conductive fibers according to one embodiment of the reference example is a method associated with the second carbonization. The conductive fibers refer to the fibers $1c$ that have completed the first carbonization treatment (output from the first carbonization furnace 15), or in other words, the fibers resulting from the first carbonization treatment.

The first carbonization process equates to a process for causing the oxidized fibers $1b$ to be electrically conductive.

The volume resistivity of the conductive fibers may be 100,000 Ω·cm or less, may preferably be 1,000 Ω·cm or less, and more preferably be 10 Ω·cm or less. The conductive fibers have no particular lower limit in its volume resistivity.

The first carbonization is a process of carbonizing fibers to have a volume resistivity of 100,000 Ω·cm or less. In other words, the first carbonization is a process of carbonizing fibers that do not break under, for example, microwave electric field heating. The second carbonization is a process of carbonizing fibers that can break (easily break) under microwave electric field heating.

(3)-1 First Carbonization Process

In the first carbonization process, the fibers are pyrolyzed through heating, and the resulting oxidized fibers $1b$ are stretched to align their orientation to form the structure that is easy to carbonize.

In the first carbonization process, the oxidized fibers $1b$ fed through the inert gas atmosphere in the first carbonization furnace 15 receive energy, which is to be converted to heat, in such a manner that heating becomes less intense in the middle of the heating process. The inert gas may be nitrogen or argon.

The first carbonization furnace 15 includes a heating unit that uses microwaves (mainly electric field energy), and is designed to change the intensity of microwaves to be applied to the oxidized fibers $1b$. In one example, the first carbonization furnace 15 includes a first furnace body, a magnetron that serves as an oscillator for generating microwaves in the first furnace body, and an adjustment mechanism for adjusting the intensity of an electric field of microwaves to be applied in the area of the first furnace body through which the oxidized fibers $1b$ are fed.

(3)-2 Second Carbonization Process

In the second carbonization process, the fibers $1c$ (conductive fibers) resulting from the first carbonization treatment through the first carbonization furnace 15 are heated using microwave magnetic field heating performed in the second carbonization furnace 17. The second carbonization process further carbonizes the fibers $1c$ resulting from the first carbonization treatment.

A microwave heating device used in this process may be designed to heat a target (conductive fibers) using microwaves in a transmission mode TE10, in which microwaves propagate from a microwave generator to a microwave heating furnace having a rectangular cross-section through a connecting waveguide. An example of the microwave heating device is described in 2. Production method. The crystal size Lc can be calculated using formula (11).

REFERENCE EXAMPLES

Reference examples will now be described in detail. In the examples described below, the conductive fibers $1c$ (fibers output from the first carbonization furnace 15) are carbonized into carbonized fibers $1d$.

The materials below were prepared or produced.

Conductive Fibers 1

As the conductive fibers 1, a fiber strand of 24,000 fibers having a volume resistivity of $1.5 \times 10^{-3}$ Ω·cm was prepared.

Reference Example 1

The conductive fibers 1 were carbonized using microwave magnetic field heating in the second carbonization furnace 17. The microwaves used in the second carbonization furnace 17 with frequencies ranging from 2400 to 2500 MHz were generated by a magnetron oscillator. The output of microwaves was 1.0 kW. The duration of irradiation of the microwaves was 30 sec. The inside of the second carbonization furnace 17 was maintained at 10 kPa in a nitrogen atmosphere.

Reference Example 2

The conductive fibers 1 were carbonized in the same manner as in reference example 1 except that the output of microwaves was 1.5 kW.

Reference Example 3

The conductive fibers 1 were carbonized in the same manner as in reference example 1 except that the output of microwaves was 2.0 kW.

Reference Example 4

The conductive fibers 1 were carbonized in the same manner as in reference example 1 except that the output of microwaves was 2.5 kW.

Reference Example 5

The conductive fibers 1 were carbonized in the same manner as in reference example 1 except that the output of microwaves was 3.0 kW.

Comparative Example 21

The conductive fibers 1 were carbonized in the same manner as in reference example 1 except that microwave electric field heating was used instead of microwave magnetic field heating.

Breakage of Fiber Strand

For the carbon fibers in reference examples 1 to 5 and comparative example 21 obtained in this manner, any breakage in their fiber strands (breakage in their fiber strands heated in the second carbonization furnace) was evaluated. Table 6 below shows the results.

TABLE 6

| | Second carbonization furnace | Output (kW) | Breakage of fiber strand |
|---|---|---|---|
| Reference Example1 | Microwave magnetic field heating | 1.0 | No breakage observed |
| Reference Example2 | Microwave magnetic field heating | 1.5 | No breakage observed |
| Reference Example3 | Microwave magnetic field heating | 2.0 | No breakage observed |
| Reference Example4 | Microwave magnetic field heating | 2.5 | No breakage observed |
| Reference Example5 | Microwave magnetic field heating | 3.0 | No breakage observed |
| Comparative Example21 | Microwave electric field heating | 1.0 | Breakage observed |

The results in Table 6 reveal that no breakage was observed in the fiber strands in reference examples 1 to 5, which were carbonized using microwave magnetic field heating, whereas breakage was observed in the fiber strand in comparative example 21, which was carbonized by microwave electric field heating.

Although these results remain unexplained, an intense electric discharge between the waveguide and the glowing fibers seemed to cause breakage of the fiber strand in comparative example 21 carbonized using microwave electric field heating, whereas no electric discharge occurred in the fiber strands in reference examples 1 to 5 carbonized using microwave magnetic field heating.

Conductive Fibers 2

As the conductive fibers 2, a fiber strand of 3,000 fibers having a volume resistivity of 18 Ω·cm was prepared.

Reference Examples 6 to 8

The conductive fibers 2 were carbonized using microwave magnetic field heating in the second carbonization furnace 17. The microwaves used in the second carbonization furnace 17 with frequencies ranging from 2400 to 2500 MHz were generated by a magnetron oscillator. The inside of the second carbonization furnace 17 was maintained at 1 to 1.5 kPa in a nitrogen atmosphere. The output of microwaves, the pressure, and the duration of irradiation of microwaves were set to the values shown in Table 7 below.

For the resulting carbon fibers in reference examples 6 to 8, any breakage in their fiber strands, the tensile strength TS, the tensile modulus TM, the elongation E, the density D, and the crystal size Lc were determined. Table 7 also shows the results. Reference examples 6 to 8 are the same as examples 1 to 3 in Table 1.

TABLE 7

| | Second carbonization furnace | Output (kW) | Pressure (kPa) | Duration (sec) | Breakage of fiber strand | Tensile strength (GPa) | Tensile modulus (GPa) | Elongation (%) | Density (g/cm³) | Crystal size Lc (nm) |
|---|---|---|---|---|---|---|---|---|---|---|
| Example6 | Microwave magnetic field heating | 1.0 | 1.0 | 32.4 | Not observed | 3.16 | 220 | 1.44 | 1.77 | 1.62 |

TABLE 7-continued

|  | Second carbonization furnace | Output (kW) | Pressure (kPa) | Duration (sec) | Breakage of fiber strand | Tensile strength (GPa) | Tensile modulus (GPa) | Elongation (%) | Density (g/cm³) | Crystal size Lc (nm) |
|---|---|---|---|---|---|---|---|---|---|---|
| Example7 | Microwave magnetic field heating | 1.0 | 1.3 | 10.8 | Not observed | 3.45 | 198 | 1.74 | 1.73 | 1.29 |
| Example8 | Microwave magnetic field heating | 2.5 | 1.5 | 10.8 | Not observed | 3.88 | 215 | 1.80 | 1.72 | 1.46 |

The results in Table 7 reveal that no breakage was observed in the fiber strands in reference examples 6 to 8, which were carbonized using microwave magnetic field heating.

Modifications

Although the invention has been described based on the above embodiments, the invention should not be limited to these embodiments. For example, the modifications described below may each be combined with any of the embodiments, and also some of the modifications may be combined with one another as appropriate.

1. Carbon Fibers

Although the method for producing carbon fibers with 12,000 filaments is described in 2. Production Method, this method can also be used to carbonize precursor fibers or produce carbon fibers with different numbers of filaments, or for example, fibers with 3,000, 6,000, and 24,000 filaments.

Although the method for producing carbon fibers described in 2. Production Method includes the carbonization process, the production method may further include a graphitization process before the surface treatment process. In other words, although the method for producing carbon fibers for general-purpose products (with the modulus of elasticity of 240 GPa) is described in 2. Production Method, the carbonization process may also be used to carbonize precursor fibers for carbon fibers for high-performance products with high elasticity, or with intermediate elasticity and high strength. The method can also be used to produce high-performance carbon fibers. The graphitization process may be performed using microwave magnetic field heating.

2. Carbonization

The first carbonization and the second carbonization may both be performed using microwave magnetic field heating alone.

REFERENCE SIGNS LIST

1 fibers
1a precursor
1b oxidized fibers
1c fibers resulting from first carbonization treatment
15 first carbonization furnace
17 second carbonization furnace
21 roller
23 roller

The invention claimed is:

1. Carbon fibers having an elongation of 1.5% or greater and a density of 1.79 g/cm³ or less, and satisfying the relationship represented by formula (1) and one of the relationships represented by formulas (2) to (5):

$$La \geq 1 \quad (1),$$

$$La \leq -0.5 + 0.01 \times TM \text{ when } 170 \leq TM \leq 230 \quad (2),$$

$$La \leq -37.3 + 0.17 \times TM \text{ when } 230 < TM \leq 240 \quad (3),$$

$$La \leq -2.5 + 0.025 \times TM \text{ when } 240 < TM \leq 300 \quad (4), \text{ and}$$

$$La \leq 2 + 0.01 \times TM \text{ when } 300 < TM \quad (5)$$

where La is a crystal size in nm in a direction parallel to an axis of the fibers measured with X-ray diffraction, and TM is a tensile modulus in GPa.

2. The carbon fibers according to claim 1 satisfying the relationships represented by formulas (6) and (7):

$$Lc \geq 1 \quad (6), \text{ and}$$

$$Lc \leq 0.4 + e^{(0.006 \times TM)} \quad (7)$$

where Lc is a crystal size in nm in a direction perpendicular to an axis of the fibers measured with X-ray diffraction, and e is a base of a natural logarithm.

3. The carbon fibers according to claim 1, wherein the fibers have a tensile modulus TM of 230 or greater, and a tensile strength of 4300 MPa or greater.

4. The carbon fibers according to claim 3, wherein the fibers have a tensile modulus TM of 300 or greater, and a tensile strength of 5900 MPa or greater.

5. A method for producing the carbon fibers according to claim 1, the method comprising:
   carbonization using microwave magnetic field heating and/or plasma heating.

6. The method for producing the carbon fibers according to claim 5, wherein
   the microwave magnetic field heating uses a portion of a magnetic field distribution in which magnetic field energy is greater than electric field energy.

7. The carbon fibers according to claim 1, wherein
   The fibers have a tensile modulus TM of 200 or greater, and a tensile strength of 3200 MPa or greater.

8. Carbon fibers satisfying the relationship represented by formula (1) and one of the relationships represented by formulas (2) to (5):

$$La \geq 1 \quad (1),$$

$$La \leq -0.5 + 0.01 \times TM \text{ when } 170 \leq TM \leq 230 \quad (2),$$

$$La \leq -37.3 + 0.17 \times TM \text{ when } 230 < TM \leq 240 \quad (3),$$

$$La \leq -2.5 + 0.025 \times TM \text{ when } 240 < TM \leq 300 \quad (4), \text{ and}$$

$$La \leq 2 + 0.01 \times TM \text{ when } 300 < TM \quad (5)$$

where La is a crystal size in nm in a direction parallel to an axis of the fibers measured with X-ray diffraction, and TM is a tensile modulus in GPa, and
wherein the fibers have a tensile modulus TM of 230 or greater, and a tensile strength of 5900 MPa or greater.

* * * * *